United States Patent
Weiss et al.

(10) Patent No.: US 12,455,305 B2
(45) Date of Patent: *Oct. 28, 2025

(54) PROJECTION DISTRIBUTION OF MAGNETIC FIELD SENSORS FOR MEASURING A MAGNETIC FIELD OF A CONDUCTOR OF AN ELECTRIC CURRENT

(71) Applicant: Siemens Aktiengesellschaft, Munich (DE)

(72) Inventors: Roland Weiss, Erlangen (DE); Florian Zapf, Bayer (DE); Karl Fleisch, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 91 days.

This patent is subject to a terminal disclaimer.

(21) Appl. No.: 17/928,038

(22) PCT Filed: May 6, 2021

(86) PCT No.: PCT/EP2021/061943
§ 371 (c)(1),
(2) Date: Nov. 28, 2022

(87) PCT Pub. No.: WO2021/239426
PCT Pub. Date: Dec. 2, 2021

(65) Prior Publication Data
US 2023/0213562 A1    Jul. 6, 2023

(30) Foreign Application Priority Data
May 26, 2020    (DE) .................. 10 2020 206 527.6

(51) Int. Cl.
*G01R 21/08*    (2006.01)
*G01R 33/02*    (2006.01)

(52) U.S. Cl.
CPC ......... *G01R 21/08* (2013.01); *G01R 33/0206* (2013.01)

(58) Field of Classification Search
CPC ........ G01R 1/02; G01R 15/207; G01R 21/08; G01R 33/0206; G01R 19/0092;
(Continued)

(56) References Cited

U.S. PATENT DOCUMENTS

| 5,241,263 A | 8/1993 | Asahi | 324/117 |
| 5,473,244 A * | 12/1995 | Libove | G01R 15/142 |
| | | | 324/130 |

(Continued)

FOREIGN PATENT DOCUMENTS

| DE | 10 2008 030 334 | 1/2010 | G01R 15/20 |
| DE | 10 2009 054 892 | 7/2010 | G01R 15/20 |

(Continued)

OTHER PUBLICATIONS

Search Report for International Application No. PCT/EP2021/061943, 11 pages.

*Primary Examiner* — Vinh P Nguyen
(74) *Attorney, Agent, or Firm* — Slayden Grubert Beard PLLC

(57) ABSTRACT

Various embodiments of the teachings herein include an apparatus for measuring a magnetic field of a conductor of an electric current. The apparatus may include three magnetic field sensors arranged on a circumference of a non-circular ellipse defined by parallel projection or orthogonal projection of a circle. Three first positions are arranged equidistantly on a circumference of the circle. The three first positions emerge from the parallel projection or the orthogonal projection onto at least three second positions on the ellipse. The three magnetic field sensors are arranged at the (Continued)

three second positions. The magnetic field is measured without using a flux concentrator.

9 Claims, 2 Drawing Sheets

(58) Field of Classification Search
CPC .... G01R 15/202; G01R 15/205; G01R 33/02; G01R 15/18; G01R 33/09; G01R 33/0005; G01R 33/00; G01R 33/0011; G01R 33/0283; G01R 33/0094; G01R 29/0878; G01R 33/077; G01R 33/24; G01R 19/00; G01R 29/08; G01R 19/2513; G01R 33/063; G01R 33/075; G01R 33/1215; G01R 33/18; G01R 15/146; G01R 31/3275; G01R 33/12; G06F 2203/0384
See application file for complete search history.

(56) References Cited

U.S. PATENT DOCUMENTS

| | | | |
|---|---|---|---|
| 6,825,650 B1* | 11/2004 | McCormack | G01R 22/065 |
| | | | 324/126 |
| 7,164,263 B2* | 1/2007 | Yakymyshyn | G01R 15/207 |
| | | | 324/117 R |
| 9,354,257 B2* | 5/2016 | Williams | G01R 19/2513 |
| 9,423,429 B2* | 8/2016 | Fukui | G01R 19/0092 |
| 10,393,775 B2* | 8/2019 | Weiss | G01R 15/181 |
| 10,921,389 B2* | 2/2021 | Klein | H10N 52/00 |
| 11,029,342 B2* | 6/2021 | Disselnkoetter | G01R 15/205 |
| 11,150,272 B2* | 10/2021 | Chahid | G01R 15/08 |
| 11,150,275 B2* | 10/2021 | Ugge | G01R 15/20 |
| 12,174,224 B2* | 12/2024 | Weiss | G01R 15/202 |
| 2010/0156394 A1 | 6/2010 | Ausserlechner | 324/144 |
| 2012/0081110 A1 | 4/2012 | Racz | 324/252 |
| 2014/0320122 A1 | 10/2014 | Fukui | 324/244 |
| 2019/0293688 A1* | 9/2019 | Disselnkoetter | G01R 15/20 |
| 2023/0213561 A1* | 7/2023 | Weiss | G01R 33/0005 |
| | | | 324/76.11 |

FOREIGN PATENT DOCUMENTS

| | | | | |
|---|---|---|---|---|
| DE | 10 2015 100 924 | | 6/2016 | G01R 15/20 |
| EP | 2 437 072 | | 4/2012 | G01R 15/20 |
| EP | 3 543 715 | | 9/2019 | G01R 15/20 |
| JP | 2012 247250 | | 12/2012 | G01R 15/20 |
| JP | 2012247250 A | * | 12/2012 | |

* cited by examiner

PROJECTION DISTRIBUTION OF MAGNETIC FIELD SENSORS FOR MEASURING A MAGNETIC FIELD OF A CONDUCTOR OF AN ELECTRIC CURRENT

CROSS-REFERENCE TO RELATED APPLICATIONS

This application is a U.S. National Stage Application of International Application No. PCT/EP2021/061943 filed May 6, 2021, which designates the United States of America, and claims priority to DE Application No. 10 2020 206 527.6 filed May 26, 2020, the contents of which are hereby incorporated by reference in their entirety.

TECHNICAL FIELD

The present disclosure relates to electric conductors. Various embodiments of the teachings herein include apparatus and/or methods for measuring a magnetic field of a conductor of an electric current.

BACKGROUND

Shunt resistors, toroidal core transformers, in particular compensation current transformers, Rogowski coils or individual field probes, in particular a Hall probe or a GMR sensor, are currently used to measure electric currents in electric conductors. In order to measure the electric current without a flux concentrator by means of magnetic field sensors, both "open-loop" and "closed-loop" operation of individual magnetic field sensors is possible, in principle. First transformers which operate without a flux concentrator are intended, in particular, for round conductors. The present measurement methods have the disadvantage of high sensitivity to conductor geometries with a rectangular cross section and different widths of the conductor.

Conductors with a rectangular cross section and sometimes very pronounced aspect ratios occur very often in practice. Arrangements in which the magnetic field around a conductor is measured using a plurality of field probes and an attempt is made to reduce the extraneous field sensitivity by offsetting the individual signals are already known (for example EP2437072 or DE102009054892). It has often been assumed in this case that the magnetic field of the individual conductor is cylinder-symmetrical with respect to the longitudinal axis of the individual conductor. However, this prerequisite is satisfied only in the case of a cylinder-symmetrical geometry of the conductor or at a relatively large distance from the conductor.

In many technical installations, the geometry of the conductor differs greatly from a cylindrical shape, in particular in conductors which are intended to carry relatively high currents. Flat conductors with a rectangular cross section are often used, for example, in busbars in converters since this conductor shape has, on the one hand, a lower inductance per unit length and therefore a lower impedance for the same cross-sectional area and, on the other hand, enables a lower heat transfer resistance to the environment owing to the larger surface area. In addition, it is possible to manufacture the flat conductor in a cost-effective manner by means of punching and bending from a flat semi-finished product. The material thickness is predefined by the semi-finished product and is limited by the maximum power of the punching and bending machines used. The different cross sections for achieving the necessary current-carrying capacities are set using the width of the bar manufactured.

The shape of the flat conductor results in a distribution of the magnetic field, which differs from the cylindrical symmetry, and requires a current transformer with a relatively large design if the current transformer is circular. Since busbars of different widths are used in different converters, a sensor assembly which correctly measures the current irrespective of the conductor width may be advantageous. On account of the manufacturing tolerances for the magnetic field sensors and the tolerances for further electronic components, it is always necessary to compare the current sensors, for example at the end of manufacturing. If a conductor with a geometry differing from the conductor at the place of use can be used for the comparison, this is highly advantageous because a comparison which is "valid" only for specific busbar shapes is associated with great logistical disadvantages, in particular through busbar-specific storage. However, a sensor assembly which makes it possible to measure the electric current in a manner largely independent of the shape of the conductor is required for this purpose.

SUMMARY

The teachings of the present disclosure include alternative solutions for measuring electric currents in electric conductors without using a flux concentrator. For example, some embodiments of the teachings herein include an apparatus (8) for measuring a magnetic field of a conductor (1) of an electric current, wherein the magnetic field is measured without using a flux concentrator, having: at least three magnetic field sensors (2), wherein the at least three magnetic field sensors (2) are arranged on a circumference of an ellipse (4), wherein the ellipse (4) is not a circle, wherein the ellipse (4) can be defined by parallel projection or orthogonal projection of a circle, wherein at least three first positions are arranged equidistantly on a circumference of the circle, wherein the at least three first positions emerge from the parallel projection or the orthogonal projection onto at least three second positions on the ellipse (4), wherein the at least three magnetic field sensors (2) are arranged at the at least three second positions.

In some embodiments, the circle, the projection of which produces the second positions, has a diameter, wherein the diameter meets the circle at two circle points, wherein one of the at least three first positions is arranged at an axial spacing from one of the circle points, wherein the axial spacing is optimized to minimize a deviation of a result of the measurement of the magnetic field of the conductor (1) of the electric current from a real value of the magnetic field of the conductor (1) of the electric current.

In some embodiments, the circle, the projection of which produces the at least three second positions, has a diameter, wherein the diameter meets the circle at two circle points, wherein one of the at least three first positions is arranged at an axial spacing ($\varphi_0$) from one of the circle points, wherein a position spacing is defined by 360 degrees divided by a number of the at least three magnetic field sensors (2), wherein the axial spacing ($\varphi_0$): is an eighth of the position spacing in the case of an odd number (N) of the at least three magnetic field sensors (2) and is a quarter of the position spacing in the case of an even number (N) of the at least three magnetic field sensors (2).

In some embodiments, the ellipse (4) has a shortest half-axis and a longest half-axis (a), wherein the longest half-axis (a) does not exceed four times the length of the shortest half-axis.

In some embodiments, the at least three magnetic field sensors (2) each have a sensitivity axis (3), wherein the at least three magnetic field sensors (2) have the maximum sensitivity to a magnetic field oriented in the direction of the sensitivity axis (3), wherein the sensitivity axis (3) is oriented tangentially with respect to the ellipse (4).

In some embodiments, there is an odd number (N) of the at least three magnetic field sensors (3).

In some embodiments, the apparatus (8) is designed to at least partially comprise the conductor (1) of the electric current.

As another example, some embodiments include a current intensity determination unit (9) for determining an electric current intensity in a conductor (1) of an electric current, having: an apparatus (8) as described herein, and a data processing unit (5), wherein the data processing unit (5) is designed to determine the electric current intensity using measurement results from the at least three magnetic field sensors (3).

As another example, some embodiments include a method for determining an electric current intensity in a conductor (1) of an electric current by means of a current intensity determination unit (9) as claimed in claim 8, having the steps of: placing the conductor (1) of the electric current in an apparatus (8) as described herein, determining measurement results of a magnetic field strength of the magnetic field by means of the apparatus (8), transmitting the measurement results to the data processing unit (9), and determining the electric current intensity in the conductor (1) of the electric current by means of the data processing unit (5).

BRIEF DESCRIPTION OF THE DRAWINGS

The special features and advantages of the teachings herein become clear from the following explanations of a plurality of exemplary embodiments on the basis of the schematic drawings, in which.

DETAILED DESCRIPTION

Figure 1:
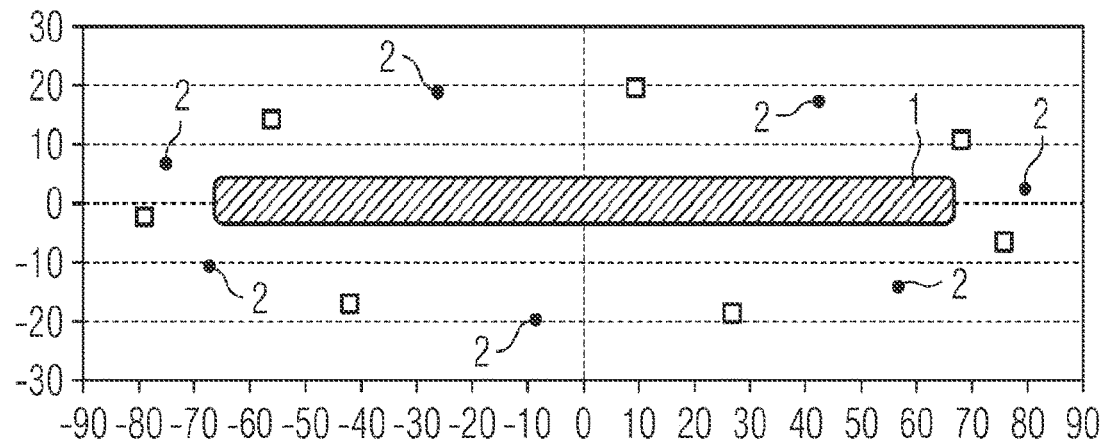
FIG. 1 shows magnetic field sensors arranged at an axial spacing from the ellipse apex incorporating teachings of the present disclosure.

Configurations, possible uses and advantages of the teachings of the present disclosure become apparent from the following description and the drawings. In some embodiments, there is an apparatus for measuring a magnetic field of a conductor of an electric current, which can also be referred to as an electric conductor, wherein the magnetic field is measured without using a flux concentrator, having at least three magnetic field sensors, wherein the at least three magnetic field sensors are arranged on a circumference of an ellipse, wherein the ellipse is not a circle, wherein the ellipse can be defined by a parallel projection or an orthogonal projection of a circle, wherein at least three first positions are arranged equidistantly on a circumference of the circle, wherein the at least three first positions emerge from the parallel projection or the orthogonal projection onto at least three second positions on the ellipse, wherein the at least three magnetic field sensors are arranged at the at least three second positions. The flux concentrator which is not used may be in the form of a ferromagnetic core, in particular.

Parallel projection is an alternative to orthogonal projection. The variant is explained in more detail below. The circumference of the circle is a virtual or imaginary shape in this case. Equidistantly arranged means that the at least three first positions are distributed at equal spacings, that is to say uniformly spaced apart, along the circumference of the circle. Angles of straight lines from the center of the circle to the at least three first positions are therefore also the same. This means that the at least three first positions are evenly distributed around the circumference and circumferential sections of the same length lie between the at least three first positions.

For the orthogonal projection, a y distance in an x-y coordinate system from the center of the circle is multiplied by an aspect ratio, wherein the aspect ratio is given by the longest half-axis of the ellipse, which can also be referred to as the long half-axis of the ellipse, divided by the shortest half-axis of the ellipse, which can also be referred to as the short half-axis of the ellipse.

For this projected arrangement, the at least three magnetic field sensors, also referred to as the magnetic field sensors below, are weighted with their respective circumferential segment. For this purpose, the circumferential segments between the magnetic field sensors are numerically calculated.

The at least three second positions are on the ellipse centrally in a respective circumferential segment of the ellipse. The respective start and end points ($x_{si}$ and $y_{si}$) of the circumferential segments can be determined by means of the following equations:

$$x_{Si} = a \cdot \cos\left(i \cdot \frac{360°}{N} + \frac{360°}{2N}\right)$$

$$y_{Si} = b \cdot \sin\left(i \cdot \frac{360°}{N} + \frac{360°}{2N}\right)$$

$$i = 0 \ldots N - 1 \in \mathbb{N}_0$$

$$b = a \cdot \cos(\gamma)$$

In this case, a and b are the half-axes of the ellipse, N is the number of magnetic field sensors or second positions. In this case, the plane which is defined by the longest edge of the cross section of the conductor of the electric current, in particular the flat conductor, and its longitudinal axis corresponds to the main plane of symmetry of the ellipse.

As an alternative to the orthogonal projection, the transition from the circle to the ellipse can also be made by compressing and/or stretching the circle into the shape of the ellipse. As described for the orthogonal projection, the magnetic field sensors would be arranged on the circle in a manner evenly distributed in terms of angle and the circle would then be brought into the shape of an ellipse by means of compression and/or stretching. A position on the ellipse is thereby assigned to each position of one of the magnetic field sensors.

The teachings of the present disclosure may improve over the prior art to the effect that an improved arrangement of the magnetic field sensors for measuring a magnetic field of a conductor of an electric current is selected, wherein the magnetic field is measured without using a flux concentrator. According to the prior art to date, a measurement of the magnetic field without using a flux concentrator is greatly dependent on an arrangement of the magnetic field sensors. This problem is overcome by the special arrangement described herein.

A flat, elliptical design that differs from a circular and/or cylinder-symmetrical arrangement of the magnetic field sensors saves space and, at the same time, makes it possible to control the individual magnetic field sensors more uniformly and thus a greater measurement range for the magnetic field and the electric current, which is advantageous, in particular, in flat conductors. An elliptical design which is suitable for different geometries of conductors and can therefore also be compared at the end of manufacturing on different busbars is also particularly favorable from a technical and logistical point of view.

The apparatus makes it possible to measure the current with very little dependence on a change in the conductor geometry. In addition, it is possible to manufacture busbars in a cost-effective and simple manner by avoiding screw points and associated losses in the busbars for introducing a cylindrical bar section, in particular a transformer bushing.

In some embodiments, the apparatus can also be used for electric conductors with a lower impedance and conductors with lower self-heating for the same losses, the magnetic field sensors can be easily compared, the magnetic field sensors can be easily started up, and the apparatus having the arrangement of magnetic field sensors, that is to say the arranged magnetic field sensors, can be used for a wide range of devices.

In some embodiments, the circle, the projection of which produces the second positions, has a diameter. The diameter meets the circle at two circle points. One of the at least three first positions is arranged at an axial spacing from one of the circle points. In this case, the axial spacing is measured as an angle between the diameter of the circle and a straight line from the center of the circle to the one of the at least three first positions. The axial spacing is optimized to minimize a deviation of a result of the measurement of the magnetic field of the conductor of the electric current from a real value of the magnetic field of the conductor of the electric current.

In addition to the axial spacing of the one of the at least three first positions and thus also of one of the at least three second positions and of one of the at least three magnetic field sensors, the further first positions of the at least three first positions have further axial spacings since the at least three first positions are arranged equidistantly.

In some embodiments, the circle, the projection of which produces the second positions, has a diameter. The diameter meets the circle at two circle points. One of the at least three first positions is arranged at an axial spacing from one of the circle points. In this case, the axial spacing is measured as an angle between the diameter of the circle and a straight line from the center of the circle to the one of the at least three first positions. A position spacing is defined by 360 degrees divided by a number of the at least three first positions. This means that the position spacing indicates a spacing between two adjacent first positions of the at least three first positions.

In some embodiments, the axial spacing: is an eighth of the position spacing in the case of an odd number (N) of the at least three magnetic field sensors or is a quarter of the position spacing in the case of an even number (N) of the at least three magnetic field sensors. In addition to the axial spacing of the one of the at least three first positions and thus also of one of the at least three second positions and of one of the at least three magnetic field sensors, the further first positions of the at least three first positions have further axial spacings since the at least three first positions are arranged equidistantly.

The at least three second positions on the ellipse can be determined by means of the following equations:

$$x_i = a \cdot \cos\left(i \cdot \frac{360°}{N} + \varphi_0\right)$$

$$y_i = b \cdot \sin\left(i \cdot \frac{360°}{N} + \varphi_0\right)$$

$$i = 0 \ldots N-1 \in \mathbb{N}_0$$

$$b = a \cdot \cos(\gamma)$$

The axial spacing $\varphi_0$ is the angle in the circle, before projection, between the diameter of the circle and a straight line from the center of the circle to the one of the at least three first positions. After projection of the ellipse, the diameter of the circle takes the place of the longest half-axis of the ellipse. The axial spacing $\varphi_0$ therefore determines the spacing between a magnetic field sensor and the point of intersection between the diameter and the circle circumference.

The above-described axial spacing in the circle and the further axial spacings in the circle may be directly determined and indicated by positions of the ellipse by means of angles $\alpha_{0-(N-1)}$, which can also be referred to as $\alpha_\mu$ (angle $\alpha_0$ between the longest half-axis of the ellipse and a straight line from the center of the ellipse to one of the at least three second positions/to one of the at least three magnetic field sensors and further angles $\alpha_{1-(N-1)}$ between the diameter of the circle and further second positions) using the following equations:

$$\alpha_\mu = \arctan\left(\frac{b}{a} \cdot \tan\left(\frac{360° \cdot (2\mu+1)}{4N}\right)\right) N \text{ even}, \mu \varepsilon \mathbb{N}_0$$

$$\alpha_\mu = \arctan\left(\frac{b}{a} \cdot \tan\left(\frac{360° \cdot (2\mu+1)}{8N}\right)\right) N \text{ odd}, \mu \varepsilon \mathbb{N}_0$$

$$\mu = 0 \ldots N-1 \in \mathbb{N}_0$$

$$b = a \cdot \cos(\gamma)$$

The angle $\alpha_0$ can also be referred to as the starting angle. In this case, a and b are the half-axes of the ellipse, N is the number of magnetic field sensors or second positions. In this case, the plane which is defined by the longest edge of the cross section of the conductor of the electric current, in particular a flat conductor, and its longitudinal axis corresponds to the main plane of symmetry of the ellipse.

The above-described axial spacing in the circle and the further axial spacings in the circle may also be directly determined and indicated by positions of the ellipse $x_i$ and $y_i$ in an x-y coordinate system using the following equations:

$N$ even,$\mu \varepsilon \mathbb{N}_0$ $$x_i = a \cdot \cos\left(i \cdot \frac{360°}{N} + \frac{360° \cdot (2\mu+1)}{4N}\right)$$

$$y_i = b \cdot \sin\left(i \cdot \frac{360°}{N} + \frac{360° \cdot (2\mu+1)}{4N}\right)$$

$N$ odd,$\mu \in \mathbb{N}_0$ $$x_i = a \cdot \cos\left(i \cdot \frac{360°}{N} + \frac{360° \cdot (2\mu + 1)}{8N}\right)$$

$$y_i = b \cdot \sin\left(i \cdot \frac{360°}{N} + \frac{360° \cdot (2\mu + 1)}{8N}\right)$$

each with:

$i = 0 \ldots N{-}1 \in \mathbb{N}_0$ $b = a \cdot \cos(\gamma)$ $\mu = 0 \ldots N{-}1 \in \mathbb{N}_0$ In this case, a and b are the half-axes of the ellipse, N is the number of magnetic field sensors or second positions. In this case, the plane which is defined by the longest edge of the cross section of the conductor of the electric current, in particular a flat conductor, and its longitudinal axis corresponds to the main plane of symmetry of the ellipse. The specified positioning of the magnetic field sensors is robust with respect to the change in the conductor geometry after the comparison, in particular at the end of manufacturing, and can therefore be universally used.

In some embodiments, the ellipse has a shortest half-axis and a longest half-axis. The longest half-axis does not exceed four times the length of the shortest half-axis. This has the advantage of minimizing a deviation of a result of the measurement of the magnetic field from a real value of the magnetic field. An experimental example is described in the description of the figures.

In some embodiments, the at least three magnetic field sensors each have a sensitivity axis. The at least three magnetic field sensors have the maximum sensitivity to a magnetic field oriented in the direction of the sensitivity axis. In some embodiments, the sensitivity axis is oriented tangentially with respect to the ellipse. This means that the sensitivity axis runs parallel to magnetic field lines of the magnetic field. This has the advantage that the direction with the maximum sensitivity measures a maximum value of the magnetic field.

In some embodiments, there is an odd number (N) of the at least three magnetic field sensors. This has the advantage of minimizing a deviation of a result of the measurement of the magnetic field from a real value of the magnetic field. An experimental example is described in the description of the figures.

In some embodiments, the apparatus is designed to at least partially comprise the conductor of the electric current. This means that the conductor is arranged inside the ellipse.

As another example some embodiments include a current intensity determination unit, which can also be referred to as a determination unit, a measurement unit or a current transformer, for determining an electric current intensity in a conductor of an electric current. The current intensity determination unit has an apparatus as described herein, and a data processing unit, wherein the data processing unit is designed to determine the electric current intensity using, that is to say with the inclusion of, measurement results of a magnetic field strength of the magnetic field of the at least three magnetic field sensors.

As another example, some embodiments include a method for determining an electric current intensity in a conductor of an electric current by means of a current intensity determination unit described herein. The method may include: placing the conductor of the electric current in an apparatus as described herein, determining measurement results of a magnetic field strength of the magnetic field by means of the apparatus, transmitting the measurement results to the data processing unit, and determining the electric current intensity in the conductor of the electric current by means of the data processing unit.

In all of the examples shown in the figures, the magnetic field is measured without using a flux concentrator or a magnetic field sensor assembly without a flux concentrator is shown. FIG. 1 shows seven magnetic field sensors 2 (N=7, represented by dots) which are arranged elliptically at an axial spacing from the ellipse apex. The seven magnetic field sensors 2 are arranged around a conductor 1 of an electric current, wherein the magnetic field is measured without using a flux concentrator.

The scale of the coordinate system is given in any desired units. The half-axis ratio of the ellipse is 4:1 (longest half-axis to shortest half-axis). The positions of the magnetic field sensors 2 were determined by means of a method for projecting a circle onto an ellipse. The ellipse can be defined by orthogonal projection of the circle, wherein at least three first positions are arranged equidistantly on a circumference of the circle, wherein the at least three first positions emerge from the orthogonal projection onto at least three second positions on the ellipse, wherein the at least three magnetic field sensors 2 are arranged at the at least three second positions.

An optimum starting angle $\varphi_0$, which can also be calculated as the axial spacing $\varphi_0$, was determined. The circle, the projection of which produces the second positions, has a diameter. The diameter meets the circle at two circle points. One of the at least three first positions is arranged at an axial spacing from one of the circle points. In this case, the axial spacing is measured as an angle $\varphi_0$ between the diameter of the circle and a straight line from the center of the circle to the one of the at least three first positions. A position spacing is defined by 360 degrees divided by a number of the at least three first positions. This means that the position spacing indicates a spacing between two adjacent first positions of the at least three first positions. In the case of seven magnetic field sensors 2, the position spacing is 360 degrees divided by 7 equals 51.4 degrees.

In some embodiments, the axial spacing $\varphi_0$: is an eighth of the position spacing in the case of an odd number (N) of the at least three magnetic field sensors and is a quarter of the position spacing in the case of an even number (N) of the at least three magnetic field sensors. The axial spacing $\varphi_0$ is the angle in the circle, before projection, between the diameter of the circle and a straight line from the center of the circle to the one of the at least three first positions. After projection of the ellipse, the diameter of the circle takes the place of the longest half-axis of the ellipse. The axial spacing $\varphi_0$ therefore determines the spacing between a magnetic field sensor and the point of intersection between the diameter and the circle circumference.

In the case of seven magnetic field sensors 2, the axial spacing $\varphi_0$ is 360 degrees divided by 7*8 equals 6.4 degrees. This corresponds to an angle $\alpha_0$ of approximately 1.63° in the x-y coordinate system of the ellipse.

Figure 2:
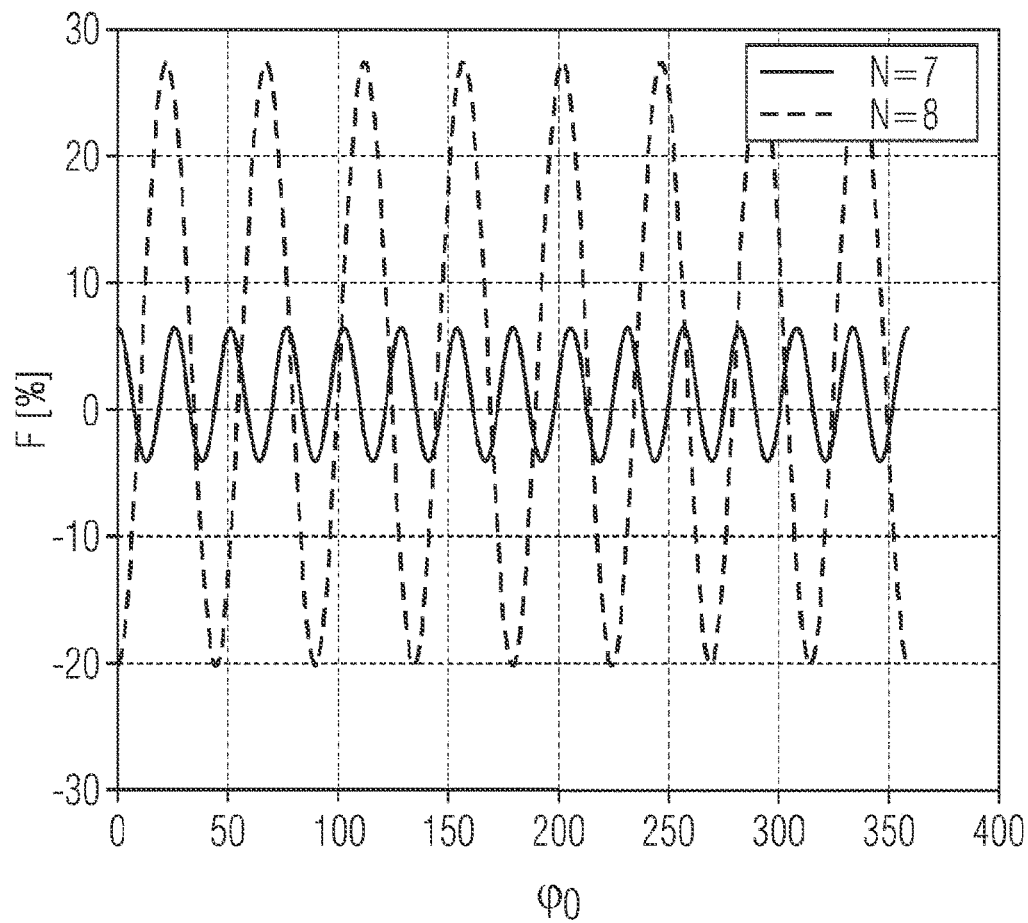
FIG. 2 shows experimentally determined measurement errors in the case of an odd and an even number of magnetic field sensors incorporating teachings of the present disclosure.

FIG. 2 shows experimentally determined measurement errors F during calibration with a linear conductor in the case of an odd number (N=7, solid graph) and an even number (N=8, dashed graph) of magnetic field sensors on the basis of the offset angle $\varphi_0$ or denotable as the axial spacing $\varphi_0$, wherein the magnetic field is measured without using a flux concentrator. The measurement error F, which can also be referred to as a relative sensitivity error F, is indicated in percent %. The relative sensitivity error F is represented for the measurement of a flat conductor with a width of 130 mm and an even distribution of the magnetic field sensors over the circumference on the basis of the offset angle $\varphi_0$ or denotable as the axial spacing $\varphi_0$. For this experiment, the flat conductor was approximated by means of 130 individual conductors which are uniformly arranged beside one another. The sensor array in the form of the ellipse has a longest half-axis of 80 mm and a shortest half-axis of 20 mm. It can be seen in FIG. 2 that the maximum relative sensitivity errors F when using seven magnetic field sensors (odd number) are smaller by a multiple than when using 8 magnetic field sensors (even number). An odd number of magnetic field sensors is advantageous. Optimization of the axial spacing $\varphi_0$ minimizes the relative sensitivity error F.

Figure 3:
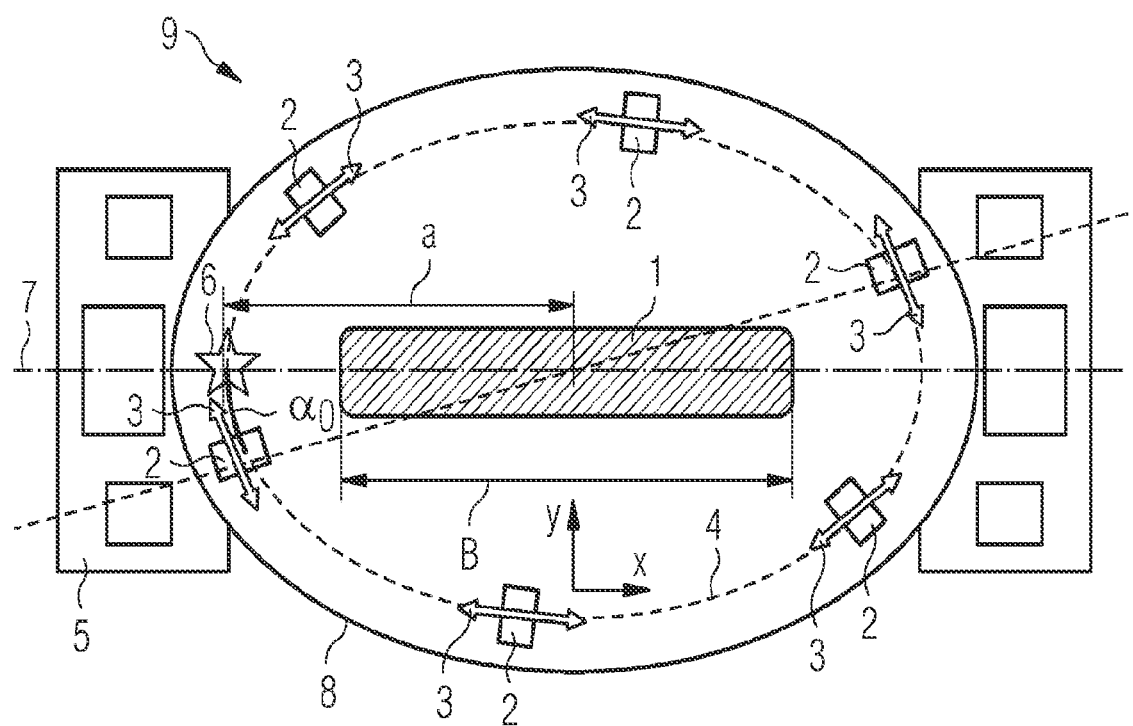
FIG. 3 shows a current intensity determination unit for determining an electric current intensity in a conductor of an electric current incorporating teachings of the present disclosure.

FIG. 3 shows a current intensity determination unit 9 for determining an electric current intensity in a conductor 1 of an electric current, wherein the magnetic field is measured without using a flux concentrator. The conductor has the width B. The current intensity determination unit 9 has an apparatus 8 and a data processing unit 5.

The apparatus 8 is designed to measure a magnetic field of a conductor 1 of an electric current. The apparatus 8 at least partially comprises the conductor 1 of the electric current. The apparatus 8 has six magnetic field sensors 2. The six magnetic field sensors are arranged on a circumference of an ellipse 4. The ellipse 4 is not a circle. The positions of the magnetic field sensors 2 were determined by means of an above-described method for projecting a circle onto the ellipse 4.

The ellipse can be defined by orthogonal projection of the circle, wherein at least three first positions are arranged equidistantly on a circumference of the circle, wherein the at least three first positions emerge from the orthogonal projection onto at least three second positions on the ellipse, wherein the at least three magnetic field sensors 2 are arranged at the at least three second positions.

The magnetic field sensors each have a sensitivity axis 3. The magnetic field sensors 2 have the maximum sensitivity to a magnetic field oriented in the direction of the sensitivity axis 3. The sensitivity axis 3 is oriented tangentially with respect to the ellipse 4.

The ellipse 4 has a longest half-axis a. The longest half-axis a is on the main axis of symmetry 7. The longest half-axis a meets the ellipse 4 at an ellipse apex 6. The ellipse apex 6 is indicated by a star in FIG. 3. One of the at least three magnetic field sensors 2 is arranged at an axial spacing $\alpha_0$ from the ellipse apex 6 along the ellipse. In this case, the axial spacing $\alpha_0$ is measured as an interior angle of the ellipse 4.

The axial spacing $\alpha_0$ is optimized to minimize a deviation of a result of the measurement of the magnetic field of the conductor 1 from a real value of the magnetic field of the conductor 1. This can be achieved, in particular, by virtue of the fact that the circle, the projection of which produces the second positions at which the magnetic field sensors are arranged, has a diameter, wherein the diameter meets the circle at two circle points, wherein one of the at least three first positions is arranged at an axial spacing $\varphi_0$ from one of the circle points, wherein a position spacing is defined by 360 degrees divided by a number of the at least three magnetic field sensors, the axial spacing $\varphi_0$: is an eighth of the position spacing in the case of an odd number (N) of the at least three magnetic field sensors and is a quarter of the position spacing in the case of an even number (N) of the at least three magnetic field sensors.

The data processing unit 5 is designed to determine the electric current intensity using measurement results from the six magnetic field sensors 2. The six magnetic field sensors 2 may measure, in particular, a magnetic field strength of the magnetic field.

Although the teachings herein have been described and illustrated more specifically in detail by means of the exemplary embodiments, the present disclosure is not restricted by the disclosed examples and other variations can be derived therefrom by a person skilled in the art without departing from the scope of protection of the teachings herein.

LIST OF REFERENCE SIGNS

1 Conductor of an electric current
2 Magnetic field sensor
3 Sensitivity axis
4 Ellipse
5 Data processing unit
6 Ellipse apex
7 Main axis of symmetry
8 Apparatus
9 Current intensity determination unit
a Longest half-axis
$\alpha_0$ Axial spacing in the ellipse
$\varphi_0$ Axial spacing in the circle
N Number of magnetic field sensors 2

What is claimed is:

1. An apparatus for measuring a magnetic field of a conductor of an electric current, the apparatus comprising:
three magnetic field sensors arranged on a circumference of a non-circular ellipse defined by parallel projection or orthogonal projection of a circle;
wherein three first positions are defined as three points equidistant from one another arranged on a circumference of the circle,
wherein the parallel projection or the orthogonal projection of the circle includes a projection of the three first positions onto three respective second positions on the non-circular ellipse;
wherein the three magnetic field sensors are arranged at the three second positions; and
wherein the magnetic field is measured without using a flux concentrator.

2. The apparatus as claimed in claim 1, wherein:
the circle has a diameter with two ends each at one of two circle points;
an axial spacing is defined as a spacing between one of the circle points and a first end of the diameter at one of the two circle points;
the axial spacing is optimized to minimize a deviation of a result of the measurement of the magnetic field of the conductor of the electric current from a real value of the magnetic field of the conductor of the electric current.

3. The apparatus as claimed in claim 1, wherein:
the circle has a diameter with two ends each at one of two circle points;
an axial spacing is defined as a spacing between one of the circle points and a first end of the diameter at one of the two circle points;
a position spacing is defined by 360 degrees divided by a number of the at least three magnetic field sensors;
the axial spacing is: an eighth of the position spacing in the case of an odd number of the at least three magnetic field sensors, or a quarter of the position spacing in the case of an even number of the at least three magnetic field sensors.

4. The apparatus as claimed in claim 1, wherein:
the ellipse has a shortest half-axis and a longest half-axis; and
the longest half-axis does not exceed four times the length of the shortest half-axis.

5. The apparatus as claimed in claim 1, wherein:
the three magnetic field sensors each have a respective sensitivity axis defined by a maximum sensitivity to a magnetic field oriented in the direction of the sensitivity axis; and
the sensitivity axis is oriented tangentially with respect to the ellipse.

6. The apparatus as claimed in claim 1, wherein:
there are more than three magnetic sensors; and
there is an odd number of magnetic field sensors.

7. The apparatus as claimed in claim 1, wherein the apparatus is designed to at least partially comprise the conductor of the electric current.

8. A current intensity determination unit for determining an electric current intensity in a conductor of an electric current, the unit comprising:
a data processing unit;
three magnetic field sensors arranged on a circumference of a non-circular ellipse defined by parallel projection or orthogonal projection of a circle;
wherein three first positions are defined as three points equidistant from one another arranged on a circumference of the circle,
wherein the parallel projection or the orthogonal projection of the circle includes a projection of the three first positions onto three respective second positions on the non-circular ellipse;
wherein the three magnetic field sensors are arranged at the three second positions;
wherein the magnetic field is measured without using a flux concentrator; and
wherein the data processing unit determines the electric current intensity using measurement results from the three magnetic field sensors.

9. A method for determining an electric current intensity in a conductor of an electric current using a data processing unit and three magnetic field sensors arranged on a circumference of a non-circular ellipse defined by parallel projection or orthogonal projection of a circle, wherein three first positions are defined as three points equidistant from one another arranged on a circumference of the circle, wherein the parallel projection or the orthogonal projection of the circle includes a projection of the three first positions onto three respective second positions on the non-circular ellipse, the three magnetic field sensors are arranged at the three second positions, wherein the magnetic field is measured without using a flux concentrator, the method comprising:
placing the conductor of the electric current in the apparatus;
determining measurement results of a magnetic field strength of the magnetic field using the apparatus;
transmitting the measurement results to the data processing unit; and
determining the electric current intensity in the conductor of the electric current by means of the data processing unit.

* * * * *